United States Patent [19]

Fischer

[11] Patent Number: 5,488,372
[45] Date of Patent: Jan. 30, 1996

[54] ELECTRONIC AVOIDANCE CONFIGURATIONS

[76] Inventor: Kenneth E. Fischer, 510 E. Main St., Box 327, Somerset, Pa. 15501

[21] Appl. No.: 404,308

[22] Filed: Aug. 2, 1982

Related U.S. Application Data

[63] Continuation-in-part of Ser. No. 236,459, Jan. 28, 1981, abandoned, and a continuation-in-part of Ser. No. 972,527, Sep. 6, 1979, abandoned, which is a continuation-in-part of Ser. No. 675,602, Apr. 9, 1976, Pat. No. 4,066,226.

[51] Int. Cl.$^6$ .............................. H01Q 15/16; B64C 1/00; B64G 1/00
[52] U.S. Cl. .................. 342/5; 342/2; 244/35 R; 244/36; 244/47; 244/158 R
[58] Field of Search .................. 244/36, 47, 35, 244/158; 343/18 R, 18 B, 18 E; D12/331, 333; 392/13; 342/2, 5

[56] References Cited

U.S. PATENT DOCUMENTS

| | | | |
|---|---|---|---|
| D. 52,066 | 5/1918 | Stout | D12/319 |
| D. 183,349 | 8/1958 | Johnson | D12/333 |
| D. 205,169 | 6/1966 | Petry | D12/319 |
| D. 244,265 | 5/1977 | Opfer | D12/333 |
| D. 254,903 | 5/1980 | Holmer et al. | D12/333 |
| D. 278,700 | 5/1985 | Powers et al. | D12/319 |
| 1,936,786 | 11/1933 | Gebhert | D12/331 |
| 3,427,619 | 2/1969 | Wesch et al. | 343/18 R |
| 3,432,609 | 3/1969 | Duvall | 343/18 B |
| 3,487,410 | 12/1969 | Barnett et al. | 343/18 R |
| 3,625,459 | 12/1971 | Brown | 244/36 X |
| 3,756,540 | 9/1973 | Williams | 244/35 R |
| 4,019,699 | 4/1977 | Wintersdorff et al. | 342/2 |
| 4,354,646 | 10/1982 | Raymer | 244/47 |
| 4,501,784 | 2/1985 | Moshinsky | 342/13 X |

OTHER PUBLICATIONS

Laury et al., "Structural Concepts and Aerodynamic Analysis for Low Radar Cross Section (LCRS) Fuselage Configuration", United Technologies Corp., pp. 1–42.

Jenkins et al., "Fundamentals of Optics", Fourth Edition, McGraw–Hill, Inc., Chapter 6.

Lowrey et al., Structural Concepts and Aerodynamic Analysis for Low Radar Cross Section (LRCS) Fuselage Configurations, Sikorsky Aircraft Division, United Technologies Corp. (Jul. 1978).

*Primary Examiner*—Gilberto Barrón, Jr.

[57] ABSTRACT

A method of construction to make military craft and weapons totally invisible to radar and active infra-red by the configuration of exterior surfaces, each surface having that specific surface figure which causes the reflected electromagnetic emission to be convergent to a point, and to be as small a return beam as possible at the distance of the detection device from the craft using the invention.

32 Claims, 9 Drawing Sheets

ELECTRONIC AVOIDANCE CONFIGURATIONS

This application is a continuation-in-part of application Ser. No. 06/236,459 filing date Jan. 28, 1981, now abandoned and a CIP of Ser. No. 05/972,527 filed Sep. 6, 1979 now abandoned, which is a CIP of Ser. No. 05/675,602 filed Apr. 9, 1976 now U.S. Pat. No. 4,066,226.

PRIOR ART

Prior art is extensive. Attempts at avoidance of, electronic detection have a history dating back to the beginning of World War II. All prior art attempted to reduce the profile or signature of radar, or to absorb or not to reflect the radar signals, or to deflect the reflections off into the distance.

Many examples of the specifics of highly refined prior art are described in U.S. Pat. No. 4,019,699, Wintersdorff, et al, as applied to an aircraft design, which is the subject of that issued Patent.

Assuming that Wintersdorff utilized all of the then (1976) known art in his specific aircraft, it is obvious that his invention is meant to be used some great distance from the detection device and meant to always present an edge, (leading edge or wingtip) toward the detection device. He claims a one percent of usual radar signal signature for his invention.

A pressing need for a concept which would allow close approach with reasonable safety was clearly needed.

BACKGROUND DOCUMENTATION OF THIS INVENTION

Two previous applications did not produce any allowable claims, Ser. No. 05/972,527, filed Sep. 5, 1979, and Ser. No. 06/236,459, filed Jan. 28, 1981.

Application Ser. No. 05/675,602 (now U.S. Pat. No. 4,066,226), "AIRFOIL, REDUCED PROFILE, "Y" FLOW, HYBRID", issued Jan. 3, 1978, and contained a disclosure document showing drawings of an aircraft using the new airfoil design and showing fuselage sidewalls and empennage side booms with sidewalls, all of which are perfectly flat plane surfaces with no convexities whatsoever.

Application Ser. No. 675,602 also contains a statement required under subsection 305(c) of the National Aeronautics And Space Act of 1958, that describes and discloses the effectiveness of the absolutely flat plane surfaces (mentioning "this craft") and their value in Electronic avoidance.

A letter sent to the commanding officer of the U.S. Army Artillery school at Fort Sill, Okla. in the summer of 1976, mentioned making an aircraft "invisible to radar".

A letter to an aircraft company in the fall of 1976 also mentioned the possibility of radar invisibility.

An Oath and Petition mentioning the Space Act statement and containing prayers for Patent protection was deposited Dec. 22, 1978, within the one year period following issue of U.S. Pat. No. 4,066,226, on Jan. 3, 1978, and was given application Ser. No. 972,527.

Specifications for application Ser. No. 972,527 were deposited in May of 1979 and received a filing date of Sep. 6, 1979. The specifications disclosed the preferred embodiment of the concave, spherical surface, which is the subject of this continuation-in-part application.

Application Ser. No. 06/236,459 filed Jan. 28, 1981, continued the prayers for allowance of claims.

TERMINOLOGY (of the word surface)

All surfaces mentioned herein are to be precise to the limits of reasonable human capability.

The invention itself is confined to all surfaces which are either spherical, or cylindrical, and of long radius of curvature and all are concave. Any convexity removes the surface from the claimed invention and also any convexity would make the surface ineffective in electronic avoidance, especially if the convexity is compound (convex in more than one direction).

Some other surfaces are mentioned which are not part of the invention, but which might be useful when combined with the surfaces which are the invention.

The word 'surface' is used to mean, "that portion of an end or side of a construction, which has a precise surface figure of high integrity".

In some cases, 'a surface' might be an entire end or side, and in other cases, each side or end might have any number of individual surfaces or segments.

In diamond cutting, each surface is called a 'facet'. Any shape can be made using exclusively any single surface figure, if enough surfaces are used.

SUMMARY OF THE INVENTION

This invention is not a single specific machine, but a basic configuration of specific surface figures, being more a method or concept of manufacture rather than the manufacture itself.

There would almost never be any reason to use this invention in the construction of any other manufacture than military weapons and equipment.

It's use is exclusively military in nature, and has no purpose in commercial or civilian activity.

This invention relates to a concept of electronic avoidance and the exact physical configurations of the exterior surface figures of the craft or objects that would best be invisible to radar or other means of electronic detection.

This concept is effective when utilized in the design of any craft, vessel, object or body.

It is the primary object of this invention to provide a simple, but effective means to construct vehicles, craft, vessels, ships, aircraft, spacecraft, rockets, re-entry vehicles, and other land craft and objects in such a manner that they will be nearly or completely invisible to radar or other means of electronic detection (active infra-red).

The basic concept differs from prior art in that all electromagnetic radiation falling on each individual surface in intentionally reflected and concentrated into as small a return beam as possible being substantially convergent.

The specific preferred surface figure is concave, and spherical. The specific radius of curvature is dependent, upon the particular designed use and is determined by:

1. The maximum distance that the invention would operate from the detection device.
2. The effective range of the detection device.
3. The effective range of weapons controlled by the detection device.

A slightly less effective surface figure, but still a very useful part of the invention is a cylindrical CONCAVE surface.

The surfaces would not need to be of as high quality as a reflecting telescope mirror, because a focused image is not required, but the surfaces should be as near optical quality as possible so that the reflected beam does not spread out too much, and so as to reduce diffusion to a minimum.

As infra-red has a shorter wavelength than radar, the surface quality is more critical for infra-red.

The most common use of the invention would be the designed surface figures of the various surfaces of aircraft, spacecraft, rockets, mechanized battle tanks, trucks, personnel carriers, ships and vessels.

The most critical surfaces for aircraft would be those facing downward or to the side or front. The most critical surfaces for surface vehicles would be those facing upward or to the side or front.

The cross section of any weapon or piece of equipment need not change greatly. The only difference in design to use this invention would require that all cross sections, lateral or longitudal, be substantially rectilineal, whether they be tri-angular, rectangular, or polygonal, and could be irregular, as long as all lines representing exterior surfaces are substantially rectilinear.

The preferred, concave spherical, surface would almost always be of rather long radius of curvature, (one to twenty miles or greater) and would appear quite flat and would therefore cause the cross sections to be substantially rectilinear as a matter of course.

This configuration of specific surface figures will cause the reflected signals to only be visible or detectable on the electronic or optical axis of the respective surface. Another way of looking at it; if every surface on a craft or vessel were like a near flattened umbrella with an imaginary handle sticking straight out from the center in the usual way, the only time that a detection device could detect the craft would be when an umbrella handle points directly at the detection device.

Only a slight change of attitude of the craft would be sufficient to prevent the detection or lock-on of radar.

Of course, the more surfaces the craft has, the more umbrella handles and the more points of possible detection.

Needless to say, all of the highly refined prior art would still be needed to make this new concept workable.

While prior art allowed an aircraft to avoid detection if it stayed some distance from the detection device, the useful and novel difference of this new concept, is that an aircraft or surface vehicle or craft can avoid detection even when it is directly overhead or very close, or even directly in front of the detection device. In the absence of a new countermeasure, this invention provides an overwhelming advantage in world military power to the country that utilizes it.

Applied to a satellite that is also optically black, it makes it electronically (radar) black and therefore invisible.

The same holds true for cruise missiles and all other weapons.

It would be desirable if existing aircraft and other weapons of the United States were at least partially retro-fitted with this new art to substantially reduce their radar cross section or profile. Attachments of radar transparent materials should be used to cover and hide the areas that exhibit this new art.

It could very well be disastrous if the United States is not at the forefront of the implementation of this new art.

BRIEF DESCRIPTION OF THE DRAWINGS

An optional dorsal fin, 73, may be used for roll axis stability and control. The airfoil chord may be conventional as shown, or may be wedge shaped with a sharp leading edge.

Since the conventional airfoil, as shown, has all spanwise lines perfectly straight or rectilinear, there is no divergence of the reflected beam in the lateral direction. All reflections would be in a straight line corresponding with the flight path of the aircraft.

The flight path would have to pass directly over the radar antenna and the aircraft would have to fly perfectly level to be detected. An intentional oscillation in the roll axis or a continual change in heading would prevent any lock on by enemy radar.

The lower surface, 35, of the airfoil conforms to the preferred surface figure, concave, spherical, with a radius of curvature of 20 miles, or more. The broken line, 15—15, is the location of the cross section shown in FIG. 15.

The radius of curvature, 20, is designed for each particular aircraft so that the center of curvature, 21, FIG. 5, is as far from the surface, 35, as the radar antenna would be when the aircraft is at the maximum distance from the radar unit. This dimension, 20, must be designed with a particular mission in mind.

FIG. 16, shows construction details of both heavy armor plate, 90, and light fabricated construction, 96. The heavy construction, 90 is representative of the usual cast, forged, or welded fabrication. The heavy plate or forging, 90, might be welded, the welds, 89, being made before the surfaces, upper 92, and side 98, are ground to make the preferred spherical surface figures. The corner or edge, 98, is produced naturally from the grinding process, and must be razor sharp.

The light fabricated sheet 96, is representative of some types of aircraft construction.

The supporting framework, 93, is welded with reinforcing elbows, tees, and "y"s, 86, and when the construction is used as an accessory or gun cover, etc, it might be mounted on the heavy welded construction as shown.

The outer skin, 96, might be light alloy or sandwich construction, and attached to the welded framework, 93, by mounting rods or screws, 94, with adjusting nuts or locknuts, 88.

The corner or edge, 95, of the juncture of adjoining surfaces, 96, is beveled, the angle of bevel being slightly less than one-half of the angle of the juncture, and must be razor sharp, and the outer edges of opposing bevels must coincide.

The radius of curvature, 20, being the distance from the top surface, 96, to the center of curvature, 21, is representative of aircraft surfaces and of the top surfaces of surface craft, being in excess, usually of 20 miles.

The radius of curvature, 20, of the side surface, 96, might be of long fixed radius of curvature or might be field adjustable by a lever, 87, turning a threaded housing on one of the screws or threaded rods, 94, in the center of the surface, causing the center of curvature, 91, of the surface figure of the side surface to be variable to coincide with the distance from the invention to the radar or detection unit, and likewise making the radius of curvature of the side surface variable, and field adjustable.

The threaded attaching rods, 94, are mounted to the skin panels with self aligning bearings, 95, to prevent distortion. If several surfaces are to field adjustable, and adjusted simultaneously, connecting rods, 99, or servos might be used to turn the adjusting handle.

All surfaces are to be concave, spherical, and of long radius of curvature (except when using cross section 19-0). Because the radius of curvature is always quite long, the surfaces appear to be nearly plane surfaces or quite flat and the cross sections appear to be substantially rectilinear.

The disclosure in paper number 11 being at one parameter of the spirit of the invention, zero positive curvature, and the other parameter of the spirit of the invention, being concave, spherical, and having a radius of curvature of about 1000 yards. The maximum tolerance of the spirit of the invention being, zero convexity, 1 degree concave per 875 feet of surface for aircraft and 1 degree concave per 26 feet of surface for the close-up infantry fighting devices and curvature in between these parameters for other land craft and sea vessels.

Only surfaces which might be subjected to detection unit emission need conform to the specified surface figures.

FIG. 19-0, is a cross section of oval or circular shape for use only as the center fuselage section of high speed aircraft.

FIG. 19-1, is a representative cross section for use as a stabilizer fin or control surface.

FIG. 19-2, is a representative cross section of an aircraft airfoil chord or possibly an aircraft fuselage or engine nacelle.

FIG. 19-3, is a triangular cross section which might be at some point in an aircraft or space craft fuselage or engine nacelle.

FIG. 19-4, is a quadrilateral cross section for general use and might be rectangular or otherwise. For longitudal cross sections, irregular polygons might be used.

FIG. 19-5, is a pentagon which might be equilateral or not, equiangular or not, and might even be re-entrant to some degree.

FIG. 19-6, is a hexagon, equilateral or not, equiangular or not, re-entrant or not.

FIG. 19-7, is a heptagon, equilateral or not, equiangular or not, re-entrant or not.

FIG. 19-8, is an octagon, equilateral or not, equiangular or not, re-entrant or not.

FIG. 19-9, is a nine-sided polygon, doubly re-entrant, equilateral or not, equiangular or not, which might be used in FIG. 17 as the cross section above the wheels.

All cross sections are drawn as being rectilinear, but in reality differ from the rectilinear toward the concave as a result of the concave, spherical surface figures which have too long a radius of curvature to draw to scale or to show the true radius of curvature or to even have a noticeable concavity in a surface or side of such small size as the drawings.

In actual practice, moderate to large size surfaces would exhibit a noticeable concavity.

In all the drawing figures the number 20 denotes the radius of curvature of the concave spherical surface. This dimension can not be given as a fixed value for all cases, but is a variable, depending upon the particular craft involved, and the particular mission design and the defensive detection devices and weapons.

In all cases, the radius of curvature is to be equal to or greater than the distance of separation between the craft using the invention and the detection device.

DESCRIPTION OF GENERAL CONCEPTS

The original concept arose from considering possible military uses of an ultra-narrow aircraft having a truncated airfoil and twin empennage booms as described in disclosure document 040331, filed Apr. 18, 1975.

Figure 12:
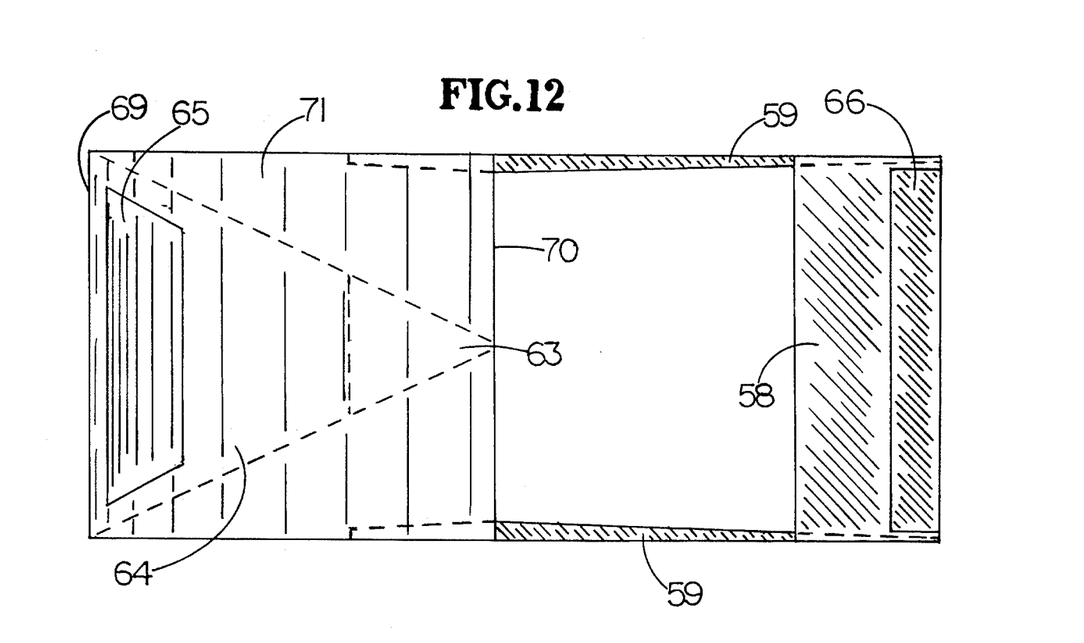
FIG. 12, is a top plan view of the naeroplane configuration wingless aircraft exactly as shown in disclosure document 040331, filed Apr. 18, 1975 and mentioned in a letter in application Ser. No. 05/675,602 filed Apr. 9, 1976, now U.S. Pat. No. 4,066,226, the aircraft being perfectly rectangular in outline, all of the surfaces of the craft being flat, plane surfaces as mentioned in paper number 11, application Ser. No. 675,602, so that radar would probably be reflected in a direction other than back to the transmitter. All surfaces are plane surfaces including the fuselage sides and rear, and top, sides and bottoms of the tail booms or empennage, or as the preferred embodiment, all surfaces are concave, spherical, and have a radius of curvature greater than the designed distance the aircraft is to operate from the detection device.
Figure 13:
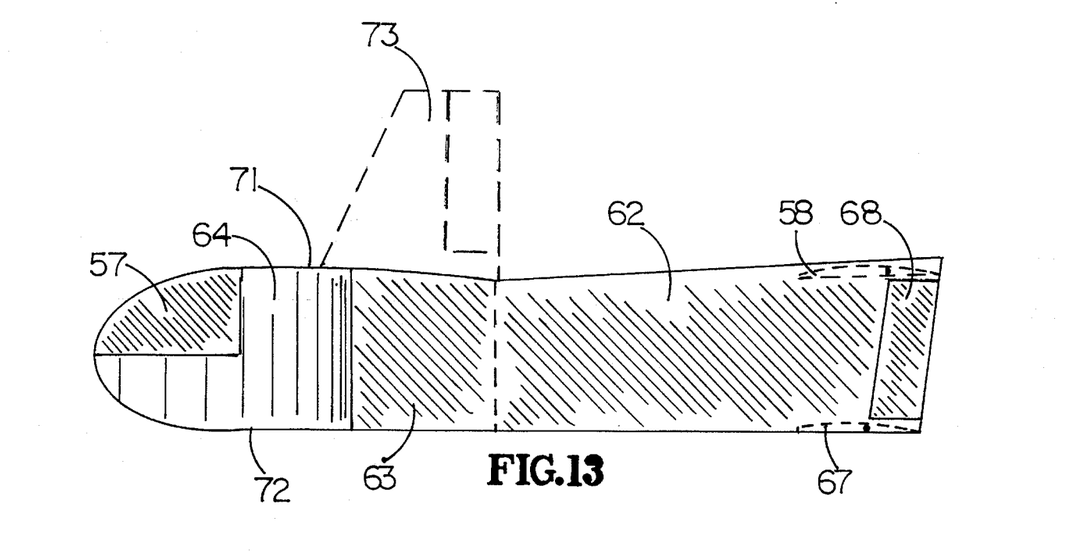
FIG. 13, is a side view of the craft in FIG. 12, the fuselage being contained within the airfoil, between the upper, 71, and the lower, 72, airfoil surfaces, containing the cockpit or payload compartment 64, and the engine or cargo compartment, 63, the airfoil having a leading edge, 69, and an upper and lower trailing edge, 70, a windshield, 65, and a side window, 57. The tail booms or empennage, have top and bottom surfaces, 59, and side surfaces, 62, to which the upper horizontal stabilizer, 58, and lower horizontal stabilizer, 67 are attached. The movable rudder control surface is identified by the numeral 68, and the movable elevator surface, is 66.

This aircraft, FIGS. 12, 13, has a minimum of surfaces and could be constructed with all surfaces each being the same as a reflecting telescope mirror.

In a telescope mirror, light rays from infinity, after reflection, converge to the focal point, producing a primary cone, and then cross and diverge or spread out in an ever widening cone, (secondary cone).

In a telescope mirror, the focal length, (of parallel light waves coming from infinity) is one-half of the radius of curvature of the mirror's surface.

The focal point, (the point where the light rays cross) is equal to the radius of curvature of the mirror, when the object being viewed is at the radius of curvature of the mirror.

The theory of operation of this art is not concerned with rays from infinity, but seeks to design the radius of curvature of the surfaces to be about equal to the distance of the detection device. Referring to "Fundamentals of Optics", by Francis A. Jenkins and Harvey E. White, Chapter 6, Section 6.2, it is stated, 'When the object (MQ) is moved toward the center of curvature (C), the image also approaches (C) and increases in size until when it reaches (C), it is the same size as the object'. This fact has profound implications in electronic avoidance.

While larger astronomical reflecting telescopes use a paraboloidal mirror, the correct surface figure for the special case where the object is at, or near, the center of curvature is the concave spherical surface. Jenkins and White also state in the preamble of Chapter 3, 'The Spherical Form For the Surfaces - - - Is Much the Easiest to Grind And Polish'.

While most optical devices are designed to focus rays from 'infinity', photocopiers and cameras used to make printing plates use optics that focus the image at about the same distance as the object (or source). In the manufacture of reflecting telescopes, a method used to test the surface figure and also to establish the radius of curvature involves placing a pinhole light source near the center of curvature of the mirror and placing the eye next to the pinhole. This test is called the 'Foucault Test' after it's inventor.

It is very difficult to find the correct position for the eye even when the mirror is mounted on a rigid bench. This art utilizes this fact and increases the difficulty by moving the mirror surface constantly. The "Standard Handbook for Telescope Making∞ by N. E. Howard provides details of this test.

The original concept called for all surfaces of the aircraft in disclosure document 040331, to be concave and spherical; to be highly polished and reflective, and to have a radius of curvature of exactly the distance it would operate from the detection device (radar or infra-red).

It was immediately obvious that in any military operation, a specific distance could not be counted on or anticipated. If the radius of curvature is shorter than the distance of separation, the more divergent the reflected rays are, and a detection device anywhere within the secondary cone, 50, FIG. 5, could detect and track or lock on to the aircraft.

The radius of curvature obviously must be great enough so that the point where the rays cross (the focal point) is always at the distance of the detection device, or more distant.

This keeps the detection device substantially within a sphere, having a radius equal to the radius of curvature of the concave surface, and having the aircraft at it's center. Within the sphere, the beam of rays is never wider than the respective reflecting surface of the aircraft.

As the rays are converging, (spherical surface) the angle of the ray-cone can be considered less than one degree. As the aircraft is free to rotate on all three axis', the circumference of the sphere being 360 degrees the area of the sphere can be considered to be 360 degrees times 360 degrees=129,600 square degrees.

The chance of the less-than-one-square-degree ray cone falling on the detection device would be nearly zero.

If the aircraft is in random oscillatory motion during flight, and in motion of translation in any direction, the ray-cone would never fall on the detection device for more than a fraction of a second.

If the detection device is radar with a rotating or oscillating antenna, the instant that the ray-cone falls on the antenna might be at a time when the antenna points the wrong way.

Of course, the more surfaces, facets, or segments there are, the more ray-cones there are to contend with.

The original concept requires a concave, spherical surface having a radius of curvature greater than the maximum distance the aircraft (invention) would ever operate from the detection device.

Each side, end, top, or bottom of the craft would have at least one such concave, spherical surface, or each side might have several such surfaces or segments of surfaces to form the desired shapes.

Prior art attempted to avoid detection and stay out of range. This new concept is so effective that, even if the enemy is aware of the presence of a weapon system using this invention, they could do nothing about it.

For easy visualization of the concept, each surface might be considered to resemble an umbrella with the usual handle representing the optical axis or electronic axis of the reflecting surface. This handle is represented by the numeral 40, in FIG. 1, 2, and 5. Any light source or radio source, at 25, FIG. 5, would be reflected to 21, FIG. 5. If the source were exactly on the optical axis or electronic axis, 25, and 21 would co-incide.

Figure 5:
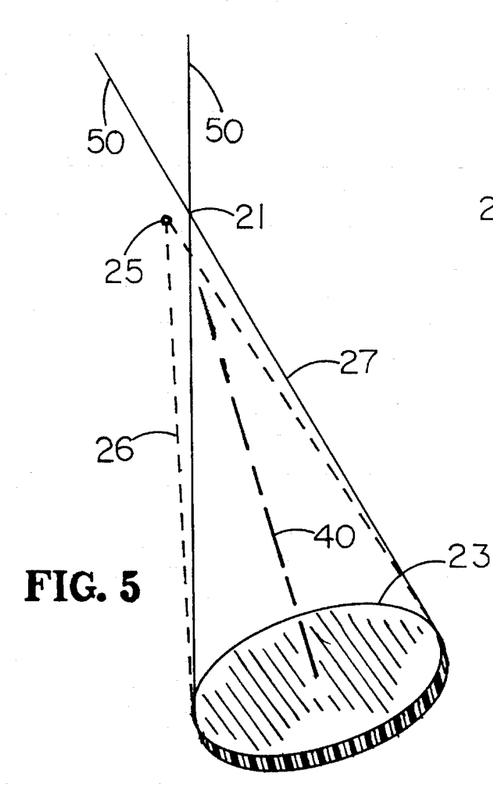
FIG. 5, is a perspective view of the reflecting telescope mirror, 23, in FIG. 1, showing, the emission cone, 26, from an optical or electronic source, 25, near it's axis, 40, and the reflected convergent primary cone, 27, and the focal plane, or point where the convergent rays cross, 21, and the secondary reflected divergent cone, 50.

This point, 21, where the rays from different points on the surface, cross, is smallest at the radius of curvature of the surface, when the source, 25, is at the distance of the radius of curvature of the reflecting surface.

When the source, 25, is offset to the side of the optical or electronic axis, the apex of the reflected primary cone, 21, is equally far to the opposite side of the optical or electronic axis, 40.

Unless a part of 21, the focal plane, falls on, 25, the source, the surface, 23, is totally invisible or black to infra-red and radar. This does not arise from a reduced or diminished radar return signal, but, as a result of a missed reflection.

Unless the handle of the imaginary umbrella, 40, is pointed directly at the detection device, the return signal misses the radar antenna, totally.

In the drawings, the curvature of the reflecting surface (mirror), is greatly exaggerated. The length of the radius of curvature, 20, is greatly foreshortened, in reality being hundreds or thousands of times the diameter of the reflecting surface.

Figure 1:
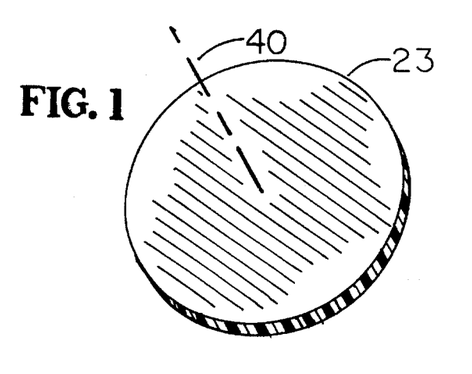
FIG. 1, is a perspective view of a representation of a reflecting telescope mirror, 23, having a spherical surface figure, and showing it's optical and electronic axis, 40.
Figures 2, 4:
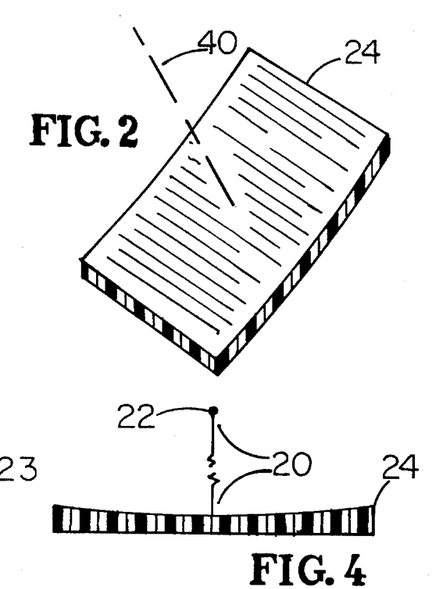
FIG. 2, is a perspective view of a representation of a reflecting mirror, 24, having a cylindrical surface figure, and showing it's optical and electronic axis, 40.
FIG. 4, is a cross sectional side view through any point on the cylindrical surface of the reflecting mirror, 24, in FIG. 2, showing the center of curvature, 22, of the cylindrical surface and the dimension of the radius of curvature, 20, the broken line denoting a very great relative dimension.
Figure 3:
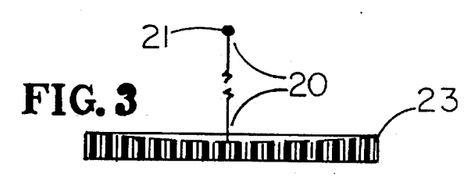
FIG. 3, is a cross sectional side view through the center of the reflecting telescope mirror, 23, in FIG. 1, showing the center of curvature, 21, of the mirror surface and the design dimension of the radius of curvature, 20, the broken line denoting a very great dimension relative to the other elements of the figure.
Figure 6:
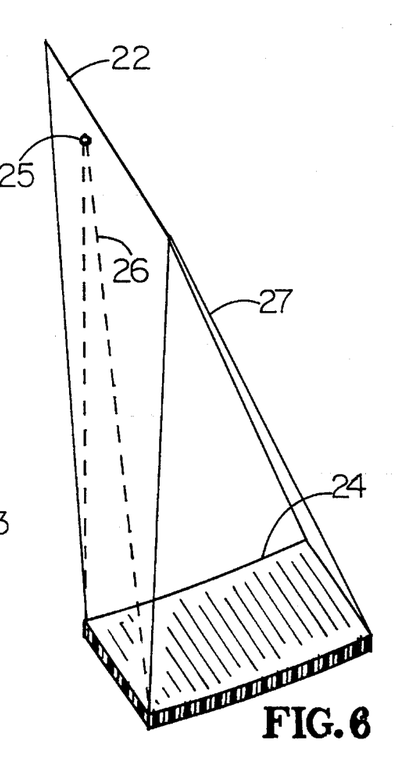
FIG. 6, is a perspective view of the cylindrical reflecting mirror, 24, in FIG. 2, showing a portion of the emission cone, 26, from an optical or electronic source, 25, near it's axis, the primary cone, 27, and the focal plane, or where the rays cross, 22. A secondary cone similar to the secondary cone, 50, in FIG. 5, does exist, but is not shown.

FIGS. 1, 3, 5, show the concept applied to the spherical surface and FIGS. 2, 4, and 6, show the concept applied to the cylindrical surface, a slightly less effective surface figure, but still an extremely useful one. The cylindrical surfaces focus the reflected beam in only one direction, while the spherical surfaces focus the reflected beam in both directions.

The surface quality need not be good enough to actually focus an image, but should be good enough to concentrate all of the reflected energy toward the same point or line.

In the case of the cylindrical surface, the width of the focal plane, 22, in FIG. 6, will never be greater than about two times the width of the reflecting surface plus two times the width of the radar antenna.

In the case of the spherical surface, the cross section diameter of the focal plane, 21, in FIG. 5, is equal to the diameter of the source, 25, or radar antenna, regardless of the size of the reflecting surface.

This assumes that the radius of curvature of the reflecting surface is precisely equal to the distance of separation between the reflecting surface and the radar unit. This cannot be assured in all cases, so it is imperative that the radius of curvature, 20, FIGS. 3 and 4, be greater than the anticipated or designed maximum distance of separation between the radar unit and the weapon system employing this invention.

Paper number 11, application Ser. No. 05/675,602 (May 1977), called for all surfaces to be plane surfaces. This would assure that the radius of curvature exceeds the distance of separation. The ease of construction of the plane surface made it a natural starting point to apply this new art.

The spherical surface can be applied to cases where the added effectiveness is required.

The plane surface has the advantage of not having a secondary ray-cone, 50, as in FIG. 5. Still the plane surface can never be as effective as the spherical surface provided that the proper radius of curvature is chosen.

Figure 7:
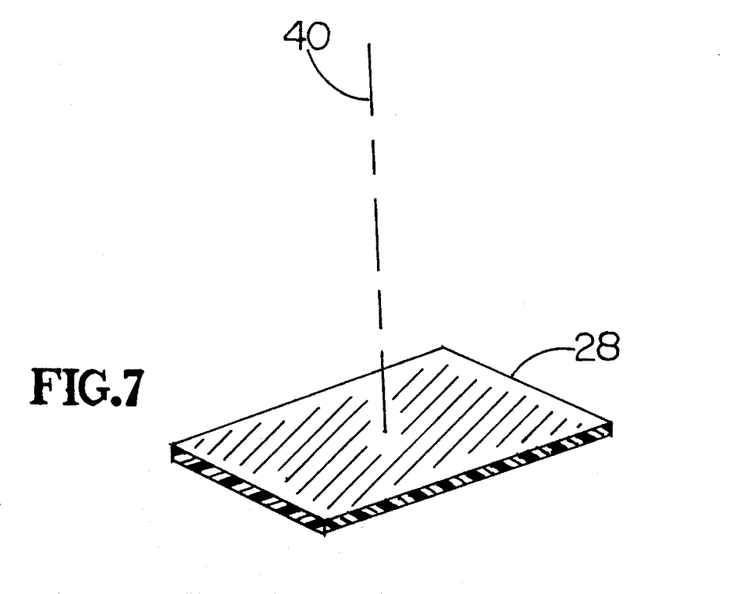
FIG. 7, is a perspective view of a rectangular optical flat, 28, showing it's optical axis, 40.

The plane surface, 28, in FIG. 7, can be considered to have an optical axis or electronic axis, 40, the same as a spherical surface. The umbrella handle analogy also applies.

Figure 8:
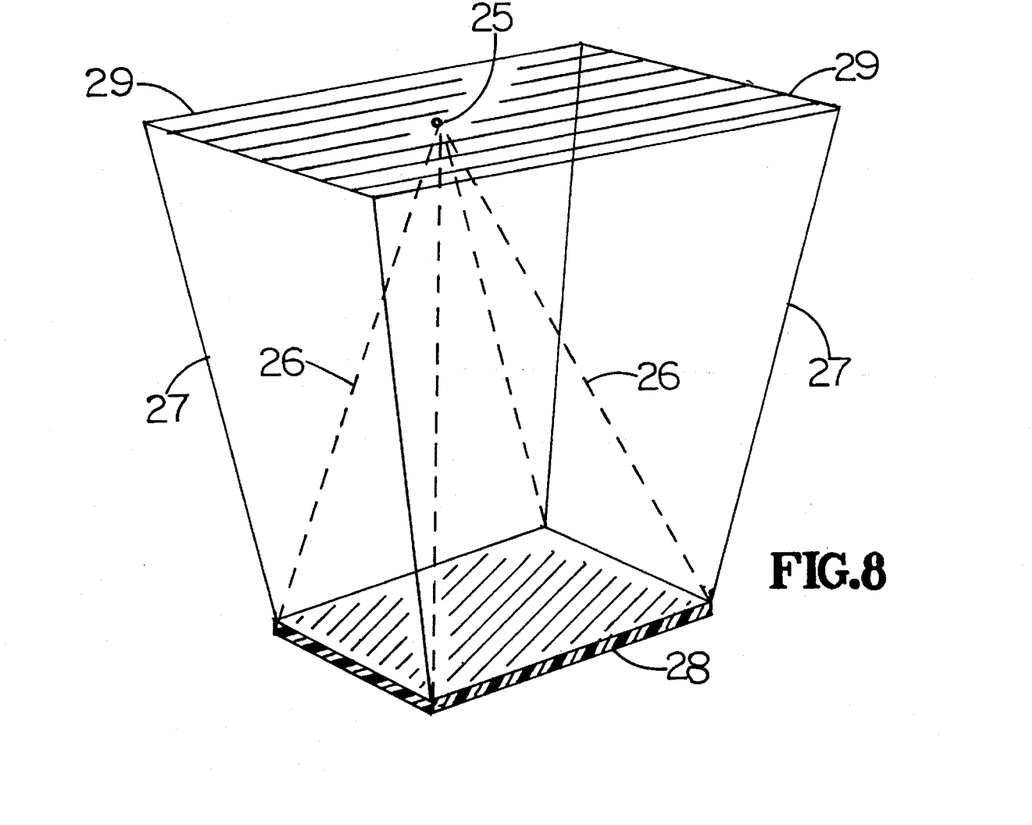
FIG. 8, is a perspective view of the optical flat in FIG. 7, showing the emission cone, 26, from an optical or electronic source, 25, and the divergent cone, 27, and the area of the cone cross section, 29, at the distance of the source. This divergent cone, 27, does continue on to infinity, or until it strikes something, and it continues it's angular divergence. This reflected cone from a plane surface has no secondary cone, 50, as in FIG. 5. The reflected beam or cone, 27, is more divergent when the source is near to the reflecting surface and less divergent when the source is more distant.

While the plane surface produces no focal plane, it might be considered to have one equal in diameter to the width of the reflected beam, 29, FIG. 8, at the distance of the radar antenna from the reflecting surface.

While the reflected beam, represented by 27, FIG. 8, is divergent to infinity, it should never subtend an angle greater than one or two degrees.

The focal plane, 21, in FIG. 5, is obviously much smaller than the pseudo-focal-plane, 29, in FIG. 8, but if the radius of curvature, 20, FIG. 3, is too short, the secondary cone, 50, in FIG. 5, would have an even greater divergence than even the divergence of the primary cone, 27, of the plane surface in FIG. 8.

The spherical surface, 23, in FIG. 5, concentrates the reflected rays in both axis' or directions. The cylindrical surface, 24, in FIG. 6, concentrates the reflected rays in only one direction or axis.

The plane surface, 28, in FIG. 8, does not concentrate the reflected rays at all, but, the divergence is the lesser when the distance between the radar antenna (the source 25,) FIG. 8, and the plane surface, 28, FIG. 8, is greater.

The spherical surface is not much more difficult to make than the plane surface, but there is danger of designing the radius of curvature too short. A spherical surface of short radius of curvature cannot be used at a greater distance from the radar than what it is designed for.

Still, each has it's own usefulness.

MAKING THE INVENTION

In aircraft and most other weapons, edges and corners have been intentionally rounded and faired, sometimes at great expense. This invention requires that this practice be almost totally stopped as far as the exterior metallic surfaces are concerned.

Undesirable sharp corners, and tight inside corners, can still be eliminated by the use of contouring or fairing which conforms to the specified surface figures in this disclosure. Reasonable, to good, aerodynamic design can be employed using the specified surface figures and fairings of radar transparent materials.

A problem in optics, and also in the different applications of this invention using various means of construction or fabrication, is the un-intentional minute rounding of corners or edges. Also, flexure of the different elements of the craft is a problem that must be avoided or controlled.

Unintentional rounding of the corners or edges can only be prevented by not working or machining any part of the surface during fabrication or after the grinding, machining or assembly. If not up to specifications, the entire surface involved must be reground, or removed and replaced.

Figure 16:
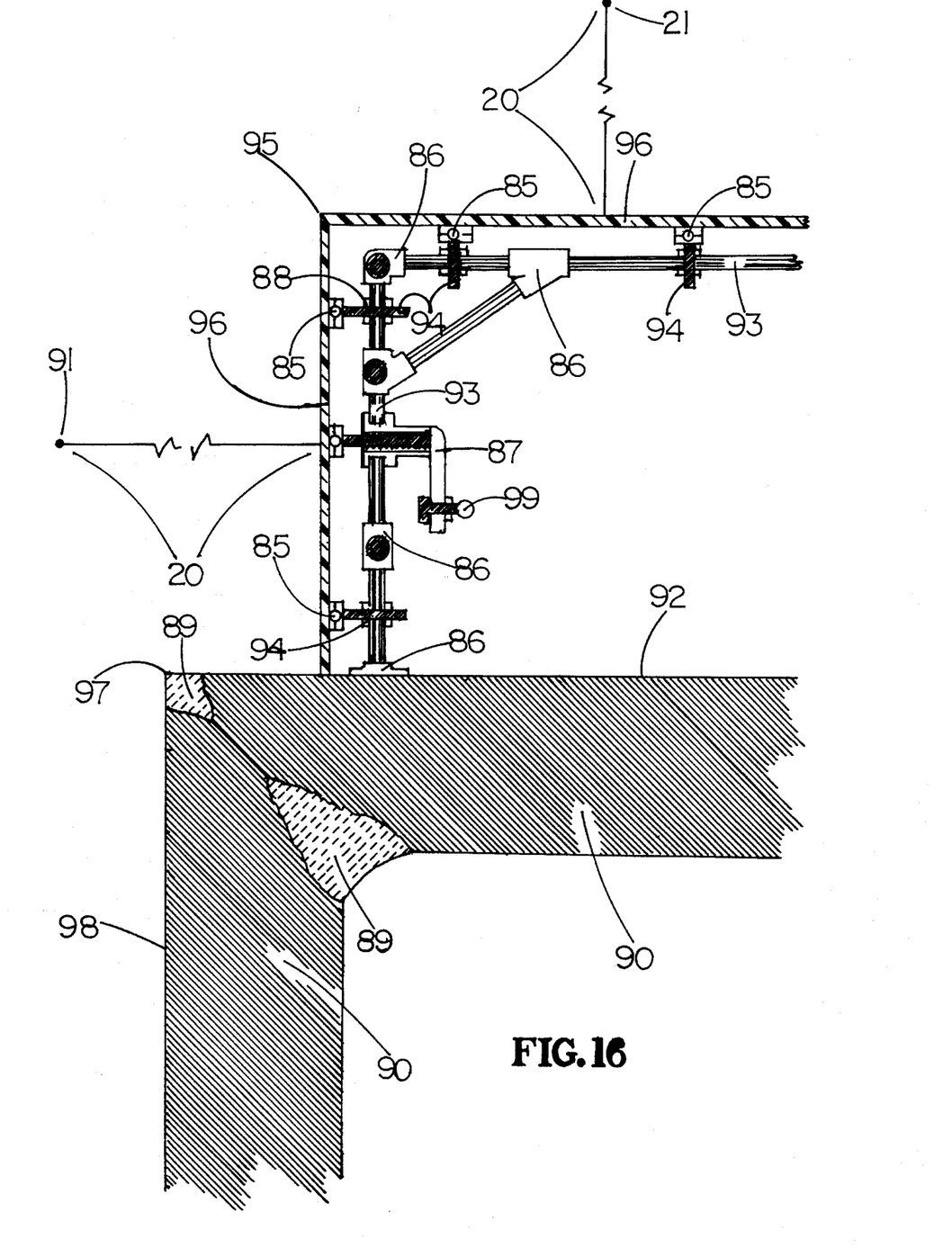

FIG. 16 shows the two major types of construction. The lower part representing heavy steel or light alloy cast, forged, or welded fabrication, such as used in a battle tank or ship turret, with surfaces machined or ground after manufacture. The upper part represents light panel fabrication which might be used as an accessory or gun cover or as the method of manufacture of light construction such as light vehicles, aircraft, spacecraft, rockets, and helicopters.

The panels, 96, FIG. 16, must be fastened to the frames, 93, by adjustable attaching threaded rods with nuts and washers, without stress on the panels. In proto-type fabrication and to some extent in production runs, the panels must be made slightly oversize and the beveled edges ground or filed and handfitted to make the juncture of the beveled edges as perfect as possible. The angle of bevel would depend on the angle of the corner or juncture, as in the cross section of a picture frame molding.

Absolutely no filing or grinding or machining can be done to the exterior surface side of the panel. All fitting must be accomplished by working the edge and adjusting the attaching screws and nuts. If too much of the edge is removed, the panel must be discarded and replaced. If a panel is dented or damaged, it must also be discarded and replaced. The filing or grinding of the edge must be a hand crafted process and each panel custom fitted. It is not at all difficult, but can be time consuming, especially until exact dimensions are established.

The heavy casting or welded structures such as a turret, must be ground exactly as a telescope mirror, after completion of the forming or casting process. The surfaces must be ground with a tool of roughly comparable hardness and grinding characteristics of the metal used in the manufacture.

The diameter of the grinding tool should be about three fourths of the diameter of the surface to be ground. Rubbing the two together with back and forth movements, with abrasive grit (carborundum) in between, will produce a concave spherical surface, if the tool is rotated in a patterned random fashion, and the back and forth rubbing movement vectors relative to the surface being ground are rotated in an opposite direction.

Instructions for grinding and testing the curvature of the surface and polishing are given in any book on telescope making. Any metal can be ground and polished in this manner and most metals have been used at one time or another, for telescope mirrors, in addition to glass.

The mounting method for the panels has been used for mounting the mirrors in a stress free cell or holder, almost since the invention of the reflecting telescope.

DESCRIPTION OF THE PREFERRED EMBODIMENT

The preferred embodiment is a construction having all exterior reflecting surfaces of precise surface figure and which, because of their concave curvature and surface finish, cause the reflected beams to converge to the smallest size possible, at the distance of the detection device.

The concave curvature of the reflecting surface is the feature which produces the desirable convergence of the reflected emissions.

Ideally, if a specific distance from the detection device could be maintained, for instance, 10 miles, all surfaces of the craft, vessel, or aircraft could have a radius of curvature, 20, of 10 miles.

Since most military weapons must approach a target from a great distance, a radius of curvature, 20, greater than the maximum distance of separation between the invention and the detection device must be used, but not necessarily greater than the range of the detection device.

This would usually mean a radius of curvature, 20, in excess of 20 miles (100,000 feet). Certain specific uses might require a short radius of curvature, 20, such as a close up infantry vehicle or shield which might only be subjected to infra-red detection.

In some cases, such as a mechanized battle tank, it might be desirable to have a shield, like a bulldozer blade, with a long radius of curvature, 20, for approaching the target, and after dropping the blade, expose surfaces having a radius of curvature, 20, of perhaps, 2 miles. This would provide an improved protection against close-up detection or enemy fire control.

The PREFFERED SURFACE FIGURE for all exterior surfaces, is CONCAVE AND SPHERICAL, with a RADIUS OF CURVATURE GREATER than the distance of separation between the detection device and the surfaces of the invention.

While an absolutely flat plane surface, 28, FIG. 7, of small finite size, if some considerable distance from the detection device, approximates a concave spherical surface, 23, FIG. 3, of long radius of curvature, 20, FIG. 3, the plane surface is NOT the preferred embodiment.

The plane surface does seem to be the EASIEST to construct. It is a surface which allows it's use at any distance from the detection device, but it is not as effective at any distance as the concave spherical surface of specified radius of curvature.

As, the plane surface works because of the small angle of divergence of the reflected ray cone, 27, FIG. 8, the greater the distance of separation, the better the plane surface works.

This is not true of the concave spherical surface, 23, FIG. 5 which is effective even when very close to the detection device. With a concave spherical surface, the rays, 27, FIG. 5, cross at the focal point, 21, and diverge from that point on, 50. As the invention moves farther from the detection device, the focal point, 21, (from optical theory) moves closer to the invention (shortens), and the diverging rays, 50, FIG. 5, spread wider, diminishing the effectiveness of the invention, but, with the proper radius of curvature, the concave spherical surface is far superior to the plane surface.

Most weapons using the invention, except spacecraft, should have all surfaces concave and spherical, with a radius of curvature, 20, in excess of 20 miles, and a spherical surface figure.

A small percentage could have a shorter radius of curvature for military operations close to the detection device, but would have to hide behind another craft (when at a distance greater than the designed distance) having concave surfaces with a radius of curvature of 20 miles or more.

Since the invention covers the full range of all military weapons, only examples can be described without an unduly long disclosure. The defense agencys and contractors are well qualified to adapt the invention to any other weapon system.

This disclosure is only concerned with the exact physical surface figures of any exterior reflecting surface of the weapon system using the invention. All good and reasonable prior art should be used to support the objective of the invention.

For instance, all surfaces which constitute the invention should be highly polished and metallic.

Also, all windows should be coated with or have a deposited metal coating. Rounded leading edges of wings and rounded wing tips and any required fairing which cannot conform to the specifications, must be made of radar transparent material, overlaying the specified concave spherical surface figures.

Any protruding fixtures, such as ladders, handholds, brackets, etc., can be of fiberglass or carbon re-inforced plastic. Any appendages which do not contain metallic or radar reflecting objects, can be of radar transparent materials.

Portions of airducts, nacelles, fuselages, etc., which protrude past a surface that acts as a shield, can be radar transparent as long as these portions do not need to be used to shield other radar reflecting objects within or attached to the aircraft or surface craft, or spacecraft.

Molded plastic, glass or carbon reinforced plastic structural components can have an applied layer of metal (aluminum), which is highly reflective to infra-red and radar, provided, that high quality, near optical quality, surface figures are maintained.

U.S. Pat. No. 4,019,699, Wintersdorff, et al, Apr. 26, 1977, can be referred to for construction details using combinations of radar absorbing and radar transparent materials.

The preferred embodiment can be of virtually any polygonal cross section, the sides differing from rectilinear as a result of being concave spherical surface figures.

The number of sides or surface segments must be held to a minimum number that allows the desired general shape or configuration for a specific weapon system.

Figures 9, 10, 11:
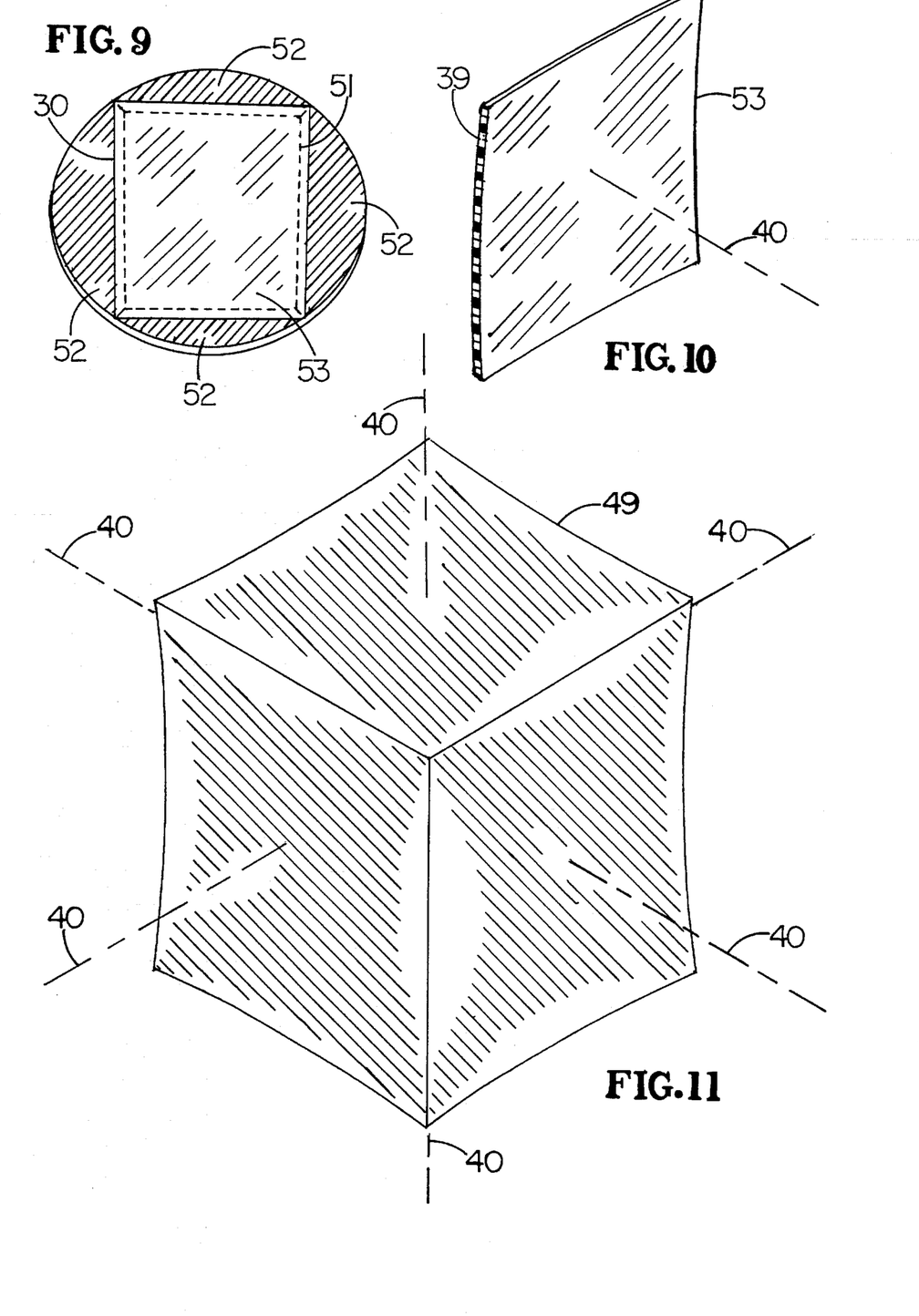
FIG. 9, is a panel, identical in surface figure to the reflecting telescope mirror, 23, in FIG. 1, showing the front cutting line, 30, and the rear cutting line, 51, producing a beveled edge. The portions cut off, 52, are to be discarded, leaving the panel, 53, ready to be assembled into one of the many possible configurations of the preferred embodiment.
FIG. 10, is that panel, 53, after the cutting shown in FIG. 9, showing it's beveled edge, 39, and it's optical or electronic axis, 40. The angle of the beveled edge, 39, being one-half of the angle of juncture of the surface with any adjacent surface.
FIG. 11, is a perspective representation of a possible configuration, 49, of a completely assembled aircraft, satellite or spacecraft, or any other military weapons system, comprised of six exterior panels, 53, showing the six optical or electronic axes', 40, this configuration being substantially a perfect cube with it's six surfaces being modified from flat plane surfaces to long radius of curvature, 20, concave spherical surfaces, the radius of curvature for spacecraft being 100 miles or more and for aircraft, 20 miles or more.
Figures 192, 193, 194, 195:
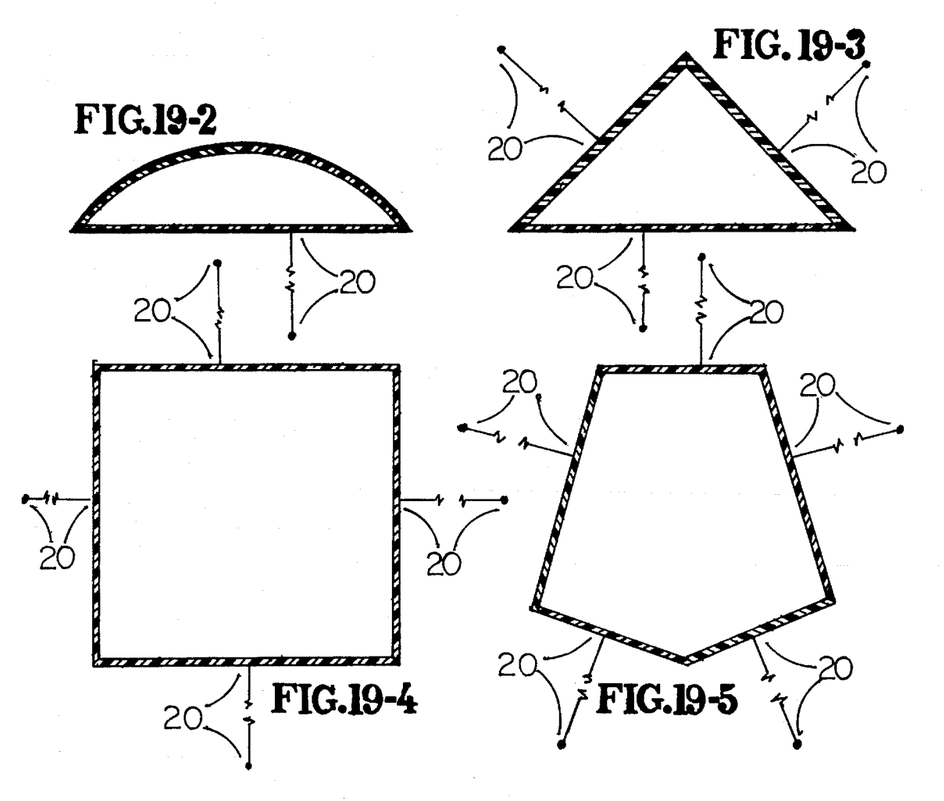

The preferred embodiment is basically similar to FIG. 11, which is quadrilateral in cross section both laterally and longitudally, 49, of substantially rectilinear cross section, FIG. 19-4, with the individual surfaces, and junctures modified to slightly concave by the concave spherical surface elements of long radius of curvature, 20, producing six imaginary umbrella handles, 40.

The edges, and junctures of all surfaces must be abrupt and razor sharp, whether of acute or obtuse angle juncture and every point of the high integrity corner must coincide with the high integrity surface that it is a part of.

Rounding of edges or fairing of interior corners must not occur unless the fairing or rounding is radar transparent material over the radar reflecting surface of the concave, spherical surface elements of long radius of curvature.

Each surface segment or side must approximate a long radius of curvature concave spherical surface as in FIG. 1. Each separate surface after manufacture will have an optical or electronic axis as shown in FIG. 1, and in FIG. 11, identified by the numeral 40.

This optical or electronic axis, if a physical reality, would resemble an umbrella handle. The only time that a detection device could detect or track a craft using this invention is when one of these umbrella handles point directly at the detection device.

The surfaces must be long radius of curvature concave, spherical surfaces, to make these umbrella handles as small as possible at the distance of the detection device. Any convexity whatsoever makes the umbrella handle into a cone which subtends an angle which is a large fraction of 180 degrees.

In FIG. 8, the ray cone, 27, (or umbrella handle) of a perfectly flat plane surface, 28, is slightly divergent in both axes', depending on the distance from the detection device, being more divergent when closer and less divergent when more distant because of the aperture of the detection device and the size or width of the reflecting surface.

FIG. 11, would make an ideal satellite or spacecraft, having a minimum number of point of possible detection (umbrella handles). If elongated on one axis, FIG. 11, would make an ideal semi-trailer body, or truck body. With modification or addition of usual accessories, FIG. 11, would become an ideal surface vehicle for any desired function (mechanized battle tank, personnel carrier, barge, patrol or torpedo boat, etc.).

For every surface, there would be an optical or electronic axis, 40, (umbrella handle) so the more surfaces, the easier it would be to detect.

FIG. 12, and FIG. 13, show the craft disclosed in application Ser. No. 675,602, and mentioned in paper number 11 as being undetectable by radar if it had all plane surfaces.

The drawing shows substantially all plane surfaces, of a complete aircraft, reduced to practice. The aircraft would be a good representation of the preferred embodiment if all of it's surfaces were to be concave, spherical and having a radius of curvature greater than the planned distance it is to operate from the detection device.

Figure 14:
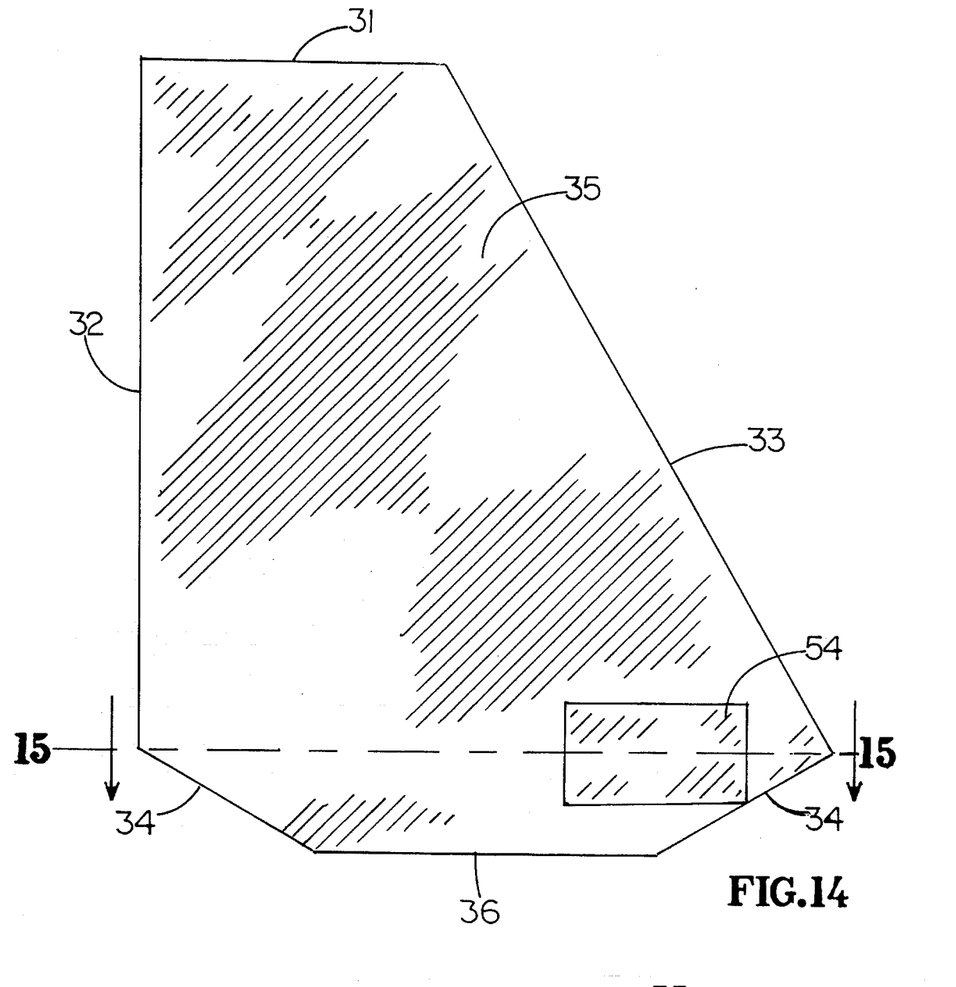
FIG. 14, is a bottom view of the right hand section of an aircraft wing having a rectilinear outline, a razor sharp leading edge, 33, a razor sharp trailing edge, 32, a razor sharp wingtip, 31, rectilinear junctions, 34, with the fuselage, and rectilinear juncture, 36, with the opposing left hand wing section (not shown).

An aircraft wing (two required), is shown in FIG. 14. It is of rectilinear outline and the preferred embodiment requires that the lower surface 35, be concave and of either spherical or cylindrical surface figures, and have a radius of curvature of 20 miles (100,000 feet).

As large aircraft have flexure during flight and at no load the wing tips droop, some accommodation must be made to prevent this flexure from destroying the effectiveness of the surface figures. The wing spar should be pre-stressed, with a droop at no load and designed to have the correct surface figure and radius of curvature in flight.

Figure 190:
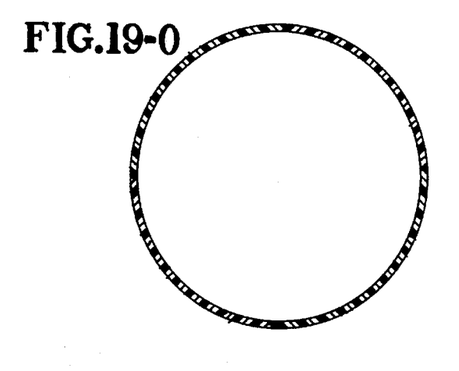
Figure 191:
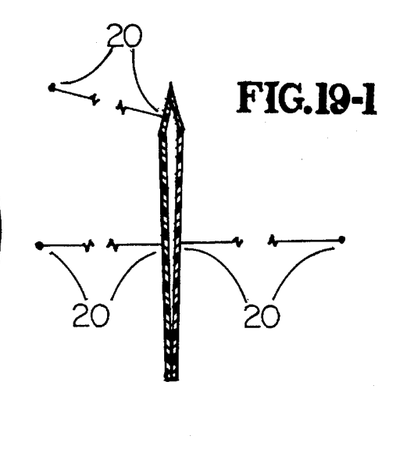

The lower wing surface should in any case, have a radius of curvature in excess of 20 miles in normal flight. It should be concave and if cylindrical, the axis of the cylinder should lie in the longitudal direction, so that when the wingtips flex upward, the convexity is only in one direction and acceptable for high speed aircraft as in FIG. 19-0.

If the axis of the cylindrical surface were to be in the spanwise or lateral direction, a compound convexity of short radius of curvature occurs as a result of wing flexure during flight.

During construction, the wing should be built on a jig having the calculated droop to produce the 20 mile radius of curvature under normal flight load and nominal angle of attack. Possibly some variable stress mechanism might be incorporated in the main spar to control the amount of stress during flight as the load decreases as a result of fuel usage or armament expenditure.

When passing directly over a radar unit, a flight path might be flown by on-board computer to maintain the desired radius of curvature by varying the angle of attack.

On smaller aircraft and rigid structure construction, and the construction which does not transfer the stress to the surface, flexure is less of a problem and the preferred concave spherical surface should be used. The concavity is so slight because of the long radius of curvature that it will not be detrimental to good airfoil design.

Figure 15:
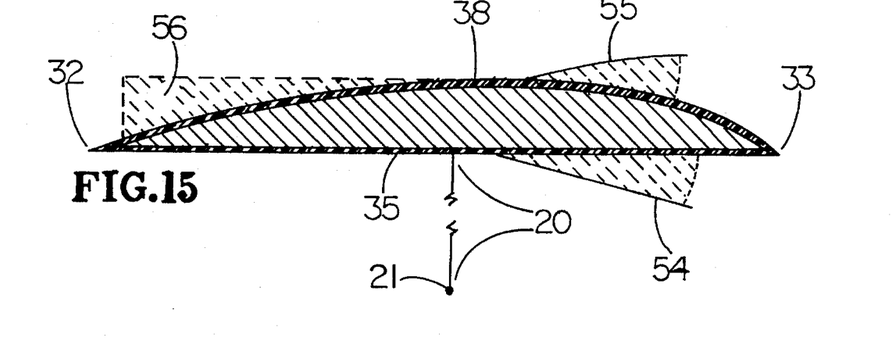
FIG. 15, is a cross sectional view of a representative chord section, showing the razor sharp leading edge, 33, and the razor sharp trailing edge, 32. The upper surface, 38, is illustrative of a conventional or nominal chord upper surface. The lower surface, 35, has a spherical surface figure and must be concave. On heavy aircraft, the lower surface could be concave and cylindrical, with the axis of the cylinder in the longitudal, or direction of motion of the aircraft.

When the design calls for heavy large aircraft, it is desirable to have the engine air intake below the wing for maximum air impact and undisturbed flow at high angles of attack. FIG. 15, number 54, shows a peek-a-boo retractable air intake under the wing which could be ducted to engines in nacelles, 56, over the trailing edge of the wing, or engines within the fuselage. The retractable air intake would be open during takeoff and landing and would be closed in high altitude flight and the air for the engine during the time that it is closed would be available from a similar air intake above the wing or from a fixed air intake, 55, FIG. 15, above the leading edge of the wing, the fixed air intake being constructed of radar transparent materials. In FIG. 15, 54 is outlined to show the possible placement of the peek-a-boo air intake.

For aircraft which might be subject to look down radar on some parts of the mission, and designed to fly at high altitude on other parts of the mission, both upper and lower air intakes might be retractable, using both on takeoff and landings, and using the upper air intake during cruise at high altitude and using the lower air intake at low altitude.

Figures 17, 18:
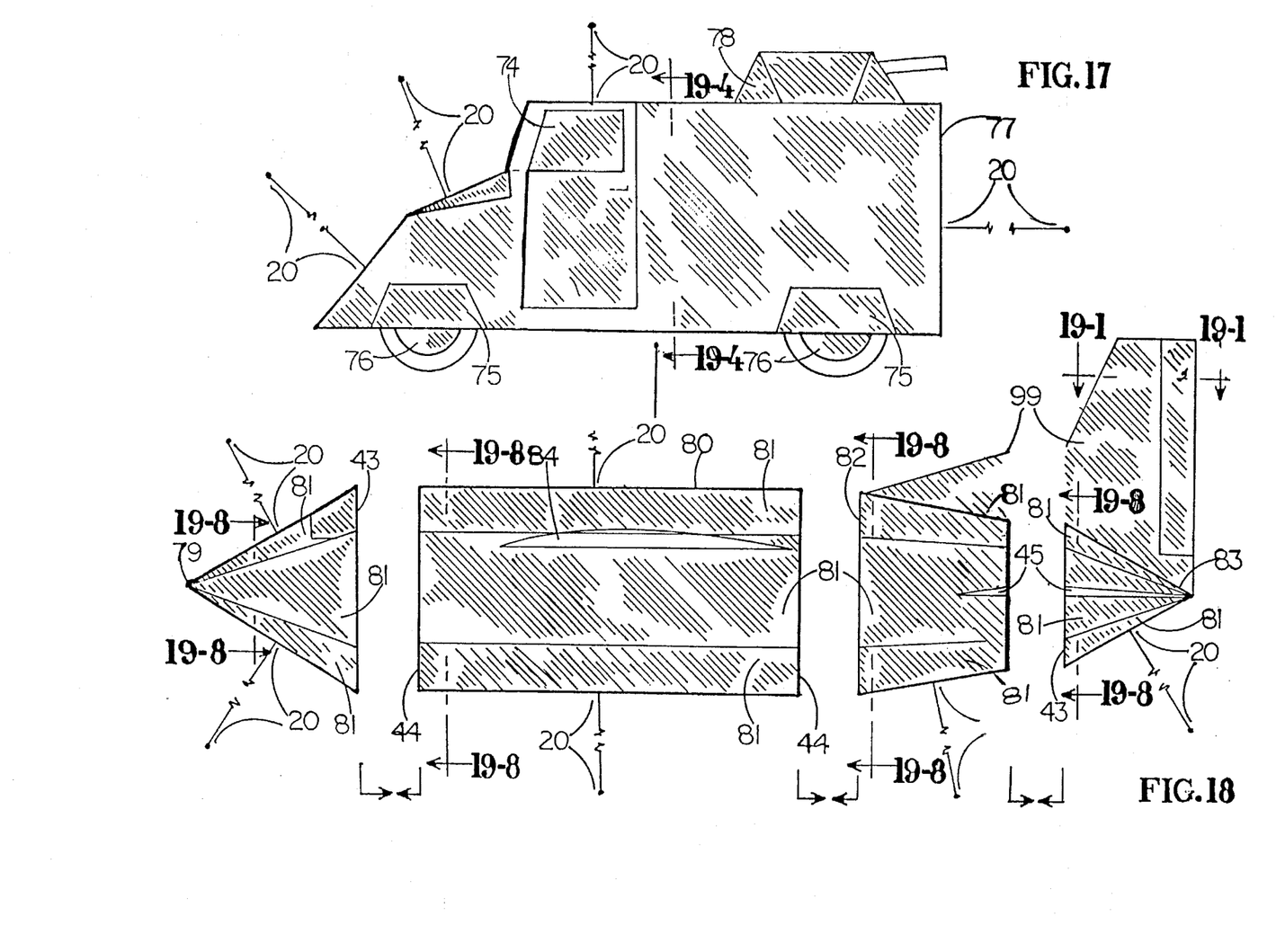
FIG. 17, is a side view of a representative land craft, with optional longitudal and lateral cross sections 19-4, 19-6, 19-9, etc, all surfaces being concave, spherical, and having a radius of curvature greater than the maximum distance the vehicle or craft would ever operate from the detection device.
FIG. 18, is a side view of a representative aircraft or large space craft, with optional cross sections, longitudally, and laterally, using any of the cross sections, 19-1, 19-2, 19-3, 19-4, 19-5, 19-6, 19-7, 19-8, 19-9, and in the case of high speed aircraft, 19-0, all of the cross sections being used at the discretion of the particular design objective.

A general representation of a large body aircraft is shown in FIG. 18. The main fuselage section, 80, is substantially an equiangular octagon or hexagon with the rectilinear surfaces, 81, being concave, and of spherical surface figure as the preferred embodiment, with a radius of curvature of at least 20 miles (100,000).

For high speed flight, concave cylindrical surfaces having a radius of curvature of 20 miles might suffice instead of the spherical surfaces.

The nose section, 79, would be substantially triangular in longitudal cross section and hexagonal, or octagonal in lateral cross section. It might enclose the cockpit.

All surfaces should conform to the specifications of the preferred embodiment.

A rear fuselage section, 82, might resemble a conical section, it's lateral cross section being hexagonal, or octagonal, the rectilinear sides, 81, being concave, spherical surfaces of long radius of curvature as specified as the preferred embodiment.

A modified tail cone, 83, of substantially polygonal cross section is used to match up with the rear fuselage section, 82, the rectilinear sides, 82, being made concave as a result of the concave spherical surface figures of long radius of curvature.

These four fuselage sections, 79, 80, 82, 83, match up to make a reasonably good aerodynamic structure, the design of which might be altered to make an aircraft or spacecraft of any type.

The main fuselage section, 80, might be fitted with wings, 84, and the rear fuselage section, 82, and the tail cone, 83, might be fitted with horizontal stabilizers, 45, and a vertical stabilizer, 99.

The engines might be in nacelles on top of the trailing edge of the wings, or in nacelles at the rear of the fuselage, or within the fuselage itself.

FIG. 17, represents a nominal surface vehicle or craft of substantially polygonal cross section, the surfaces being concave, spherical and of long radius of curvature. The cross section at different points along the longitudal axis may vary, but must match up with each other to form a useful craft or vehicle.

Figures 196, 197, 198, 199:
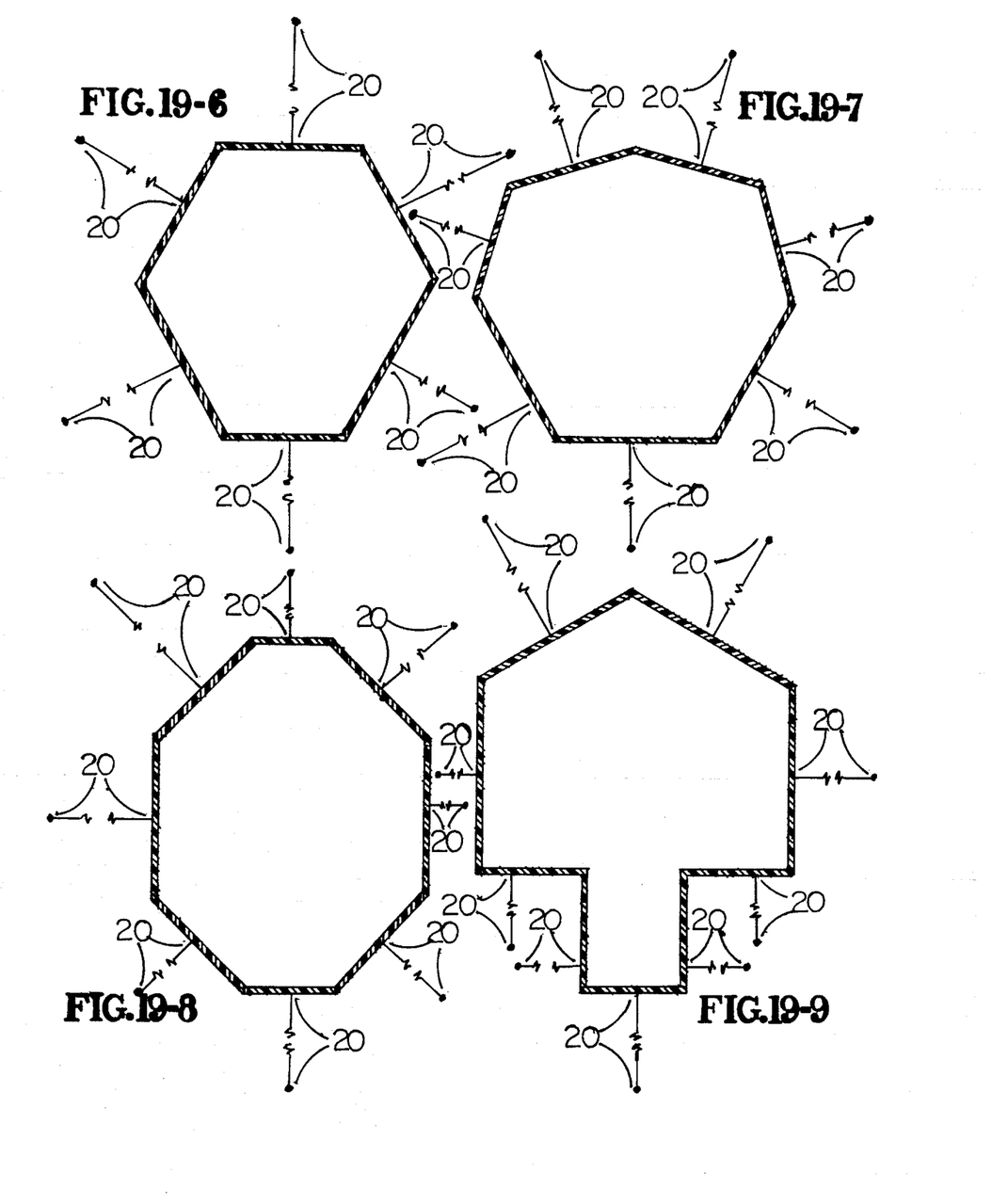

Near the front, the cross section may be an isosceles hexagon, 19-6, it's two lower vertices being substantially equiangular and rectangular. The center might have a rectangular quadrilateral cross section, 19-4, the sides being concave and spherical and of long radius of curvature.

Over the wheels, the cross section, 19-9, might be a re-entrant polygon, symmetrical on the vertical axis, the two lower outermost vertices being the ones that are re-entrant, forming wheel housings within the polygon, and being covered by wheel covers, 75. The wheels, 76, might be of radar transparent material.

The rear surface, 77, might have more than one surface provided that each surface be concave, spherical and have a radius of curvature greater than the maximum distance the vehicle will ever operate from the detection device.

If a gun turret, 78, is added, it must be placed on an area that is substantially a plane surface and must fit quite close so that there will be no diffuse or omni-directional reflections. Any windows, 74, must have a reflective surface of deposited metal.

As the invention can be applied to any and all craft, vehicles, vessels and weapon systems, the invention itself, is the configuration of the surfaces.

A certain specific cross section is not required as long as the sides are substantially rectilinear, differing from the rectilinear toward the concave.

In reality, the invention itself is the surface figure of all the surfaces.

The juxtaposition of the various surfaces, relative to each other, is unimportant, as long as each surface continues to the point of coincidence of the respective adjoining surface. As long as all surfaces have the specified surface figures of high integrity over their entire surface, it would be impossible to manufacture a construction in which the junctures of adjacent surfaces would not be the point of coincidence of the respective adjoining surfaces.

The difference between this invention and prior art, is that, prior to 1977, all art could probably be classed as being substantially convex, or as "DIVERGENT ART".

During 1977, the effectiveness of the absolutely plane surface began to be recognized and programs of tremendous size began using art which could be classed as being substantially "NON-DIVERGENT".

This disclosure, being a continuation-in-part of application Ser. No. 06/236,459 and application Ser. No. 05/972,527, represents art which results from an objective, comprehensive theory in which each surface attempts to duplicate the surface of a reflecting telescope mirror, 23, as in FIG. 1, except that the focal length and therefore the radius of curvature, is many times greater than that of any telescope mirror.

This art can only be described as "CONVERGENT ART", and is obviously the ultimate possible insofar as the configuration of exterior surfaces is concerned.

The radius of curvature of each surface is the only real variable in the art and must be equal to or must exceed the distance of separation between the craft using the invention and the electronic detection unit. The radius of curvature would therefore be for the different craft using the invention as follows:

Spacecraft: substantially equal to or greater than, the maximum planned orbital apogee. This would appear to approach being a flat, plane surface, but surfaces with a radius of curvature billions of times greater than that would still not be a flat plane surface. A concave spherical surface with a radius of curvature of 1000 miles is far superior to a flat plane surface as long as the radius of curvature is greater than the distance of separation.

For aircraft: substantially equal to or greater than 100,000 feet. As radar has a range well in excess of 20 miles, if enemy missiles are developed which have a ground to air range in excess of 20 miles, it might be necessary to have aircraft having surfaces that are concave, spherical and having a radius of curvature of 30 miles or possibly even 50 miles.

For sea craft and vessels: in general, the radius of curvature would have to be substantially the same as for aircraft, with the range of enemy missiles a prime consideration.

For land craft: each designed mission might need to use a craft having a different radius of curvature for maximum effectiveness. In any case the radius of curvature would be equal to or greater than the distance of separation between the craft using the invention and the electronic detection device.

The objective of the art in this disclosure is to construct a concave spherical surface with a radius of curvature exactly equal to the distance of separation between the craft using the invention and the electronic detection device.

The objective is not to merely make surfaces that are "as flat as possible", or "nearly flat". The criteria of the parameters of the radius of curvature is as precise as human capability can measure angular differences, which is presently much more precise than dimensional measurements.

Of course, the reason that a single specific radius does not produce the ultimate in avoidance is because the craft using the invention must approach the electronic detection device from a distance.

Convergent art (concave surfaces) will make possible more effective avoidance for any missions within, and into, heavily defended areas. The convergent art is the ultimate possible, in electronic avoidance.

I claim:

1. Spacecraft of significant military utility having structural elements configured to avoid electronic tracking and sustained weapon system lock-on, said structural elements comprising:
   (a) a plurality of faceted exterior reflecting surfaces;
   (b) said facet surfaces being concave;
   (c) a substantial number of said concave surfaces having a spherical surface figure with a radius of curvature greater than 100 miles;
   (d) the concave surfaces being metallic, highly polished, and of high precision extending to razor sharp edges;
   (e) wherein the radius of curvature of at least one of the concave surfaces is less than 1000 miles;
   the structural elements having substantially rectilinear polygonal cross sections formed by the concave surfaces; wherein said spacecraft has functional components being positioned substantially within the structural elements.

2. Spacecraft as in claim 1, wherein at least one of the cross sections is triangular.

3. Spacecraft as in claim 1, wherein at least one of the cross sections is quadrilateral.

4. Spacecraft as in claim 1, wherein at least one of the cross sections is pentagonal.

5. Spacecraft as in claim 1, wherein at least one of the cross sections is hexagonal.

6. Spacecraft as in claim 1, wherein at least one of the cross sections is seven sided.

7. Spacecraft as in claim 1, wherein at least one of the cross sections is octagonal.

8. Spacecraft as in claim 1, wherein at least one of the cross sections is nine sided.

9. Spacecraft as in claim 1, wherein at least one of the concave surfaces is cylindrical with a radius of curvature greater than 100 miles.

10. Aircraft having structural elements configured to avoid electronic tracking and sustained weapon system lock-on; said structural elements comprising, fuselage, lifting means, propulsion means, and empennage, elements:
    (a) the structural elements having a plurality of faceted exterior reflecting surfaces;
    (b) said facet surfaces being concave;
    (c) a substantial number of said concave surfaces having a spherical surface figure with a radius of curvature greater than 20 miles;
    (d) the concave surfaces being metallic, highly polished, and of high precision extending to razor sharp edges;
    (e) the structural elements having substantially rectilinear polygonal cross sections formed by the concave surfaces;
    (f) wherein at least one of the concave surfaces has a radius of curvature less than 1000 miles;
    wherein said aircraft has functional components being positioned substantially within the structural elements.

11. Aircraft having structural elements configured to avoid electronic tracking and weapon system lock-on, as in claim 10, at least one fuselage lateral cross section being triangular.

12. Aircraft having structural elements configured to avoid electronic tracking and weapon system lock-on, as in claim 10, at least one fuselage lateral cross section being quadrilateral.

13. Aircraft having structural elements configured to avoid electronic tracking and weapon system lock-on, as in claim 10, at least one fuselage lateral cross section being pentagonal.

14. Aircraft having structural elements configured to avoid electronic tracking and weapon system lock-on, as in claim 10, at least one fuselage lateral cross section being hexagonal.

15. Aircraft having structural elements configured to avoid electronic tracking and weapon system lock-on, as in claim 10, at least one fuselage lateral cross section being seven sided.

16. Aircraft having structural elements configured to avoid electronic tracking and weapon system lock-on, as in claim 10, at least one fuselage lateral cross section being octagonal.

17. Aircraft having structural elements configured to avoid electronic tracking and weapon system lock-on, as in claim 10, at least one fuselage lateral cross section being nine sided.

18. Aircraft having structural elements configured to avoid electronic tracking and weapon system lock-on, as in claim 10, wherein the surface figure of the lower surface of the wing is cylindrical with the axis of the cylinder in the longitudal direction.

19. Aircraft having structural elements configured to avoid electronic tracking and weapon system lock-on, as in claim 10, having a retractable air intake under the wing and a fixed air intake above the wing.

20. Aircraft having structural elements configured to avoid electronic tracking and weapon system lock-on, as in claim 10, having a retractable air intake under the wing and a retractable air airtake above the wing.

21. Aircraft having structural elements configured to avoid electronic tracking and weapon system lock-on, as in claim 10, the surface figure of the fuselage exterior reflecting surfaces being cylindrical with the axis of the cylinder in the longitudal direction.

22. Military equipment having structural elements configured to avoid electronic tracking and sustained weapon system lock-on, comprising:
    (a) a plurality of faceted exterior reflecting surfaces;
    (b) said facet surfaces being concave;
    (c) a substantial number of said concave surfaces having a spherical surface figure with a radius of curvature greater than 20 miles;

(d) the concave surfaces being metallic, highly polished, and of high precision extending to razor sharp edges;

(e) said structural elements having substantially rectilinear polygonal cross sections formed by the concave facet surfaces;

(f) wherein at least one of the concave surfaces has a radius of curvature less than 1000 miles;

wherein said military equipment has functional components being positioned substantially within the structural elements.

23. Military equipment as in claim 22, wherein at least one cross section is substantially triangular.

24. Military equipment as in claim 22, wherein at least one cross section is substantially quadrilateral.

25. Military equipment as in claim 22, wherein at least one cross section is substantially pentagonal.

26. Military equipment as in claim 22, wherein at least one cross section is substantially hexagonal.

27. Military equipment as in claim 22, wherein at least one cross section is substantially seven sided.

28. Military equipment as in claim 22, wherein at least one cross section is substantially octagonal.

29. Military equipment as in claim 22, wherein at least one cross section is substantially nine sided.

30. Military equipment as in claim 22, wherein the juncture of at least one surface with another surface corresponds to the points of coincidence of the respective adjoining surfaces.

31. A method of making military equipment less vulnerable to electronic tracking and sustained weapon system lock-on, comprising
   (1) fabrication of structural elements designed to be integrated into parts and machines having substantial military utility; said structural elements comprising:
      (a) a plurality of faceted exterior reflecting surfaces;
      (b) said facet surfaces being concave;
      (c) said concave surfaces being spherical with a radius of curvature greater than 20 miles and wherein at least one of the concave surfaces has a radius of curvature less than 1000 miles;
      (d) the facet surfaces being highly polished, metallic, and of high precision extending to razor sharp edges;
      (e) the structural elements having substantially rectilinear polygonal cross sections formed by the facet surfaces; and,
   (2) assembly of the fabricated structural elements into articles and machines having military utility as designed;
wherein said military equipment has functional components contained substantially within the assembled structural elements.

32. A method of making heavy military equipment less vulnerable to electronic tracking and sustained weapon system lock-on, comprising:
   (1) fabrication of welded structural elements designed to be integrated into parts and machines having substantial military utility, wherein:
      (a) said structural elements have a plurality of faceted exterior reflecting surfaces;
      (b) the structural elements having substantially rectilinear polygonal cross sections formed by said facet surfaces; and then,
   (2) grinding and polishing the facet surfaces in a manner common to reflecting telescope mirror-making;
      (c) the facet surfaces being made concave as a result of the grinding and polishing;
      (d) said concave surfaces being spherical with a radius of curvature greater than 20 miles and wherein at least one of the concave surfaces has a radius of curvature less than 1000 miles;
      (e) the concave surfaces being highly polished, metallic, and of high precision to razor sharp edges; and
   (3) assembly of the welded structural elements into articles and machines having military utility as designed;
wherein said military equipment has functional components contained substantially within the assembled structural elements.

* * * * *